US006319611B1

(12) United States Patent
Mathias et al.

(10) Patent No.: US 6,319,611 B1
(45) Date of Patent: Nov. 20, 2001

(54) CYCLOPENTADIENE DERIVATIVES FOR CARBON-CARBON COMPOSITES

(75) Inventors: Lon J. Mathias, Hattiesburg, MS (US); Gregory J. Tregre, Allison Park, PA (US)

(73) Assignee: The University of Southern Mississippi, Hattiesburg, MI (US)

(*) Notice: Subject to any disclaimer, the term of this patent is extended or adjusted under 35 U.S.C. 154(b) by 0 days.

(21) Appl. No.: 09/426,303

(22) Filed: Oct. 25, 1999

Related U.S. Application Data

(62) Division of application No. 08/835,893, filed on Apr. 8, 1997, now Pat. No. 5,973,092.
(60) Provisional application No. 60/014,927, filed on Apr. 8, 1996.

(51) Int. Cl.[7] .................................................... B32B 11/02
(52) U.S. Cl. .......................... 428/408; 524/855; 524/856
(58) Field of Search ............................ 428/408; 524/550, 524/554, 855, 856

(56) References Cited

U.S. PATENT DOCUMENTS

| | | | |
|---|---|---|---|
| 2,237,825 | 4/1941 | Ralston et al. | 526/291 X |
| 2,331,869 | 10/1943 | Adelson et al. | 526/291 X |
| 4,201,702 | 5/1980 | Blount | 526/291 X |

OTHER PUBLICATIONS

1996:224079 CAPLUS abstract of Polym. Mat. Sci. Eng. (1996), 74, 53–54.*

"Synthesis and Characterization Of Propargylated Cyclopentadiene Resins for Use in Carbon/Carbon Composites," by Gregory J. Tregre and Lon J. Mathias, Department of Polymer Science, University of Southern Mississippi, Hattiesburg, MS 39401, pp. 319–320.

*Polymer Composites*, Dec. 1994, vol. 15, No. 6, "Synthesis and Characterization of a New Class of Thermosetting Resins: Allyl and Propargyl Substituted Cyclopentadiene Derivatives," by Lon J. Mathias and Jeno Muthiah, Department of Polymer Science, University of Southern Mississippi, Hattiesburg, Mississippi, pp. 464–473.

* cited by examiner

*Primary Examiner*—Fred Teskin
(74) *Attorney, Agent, or Firm*—Howrey Simon Arnold & White, LLP

(57) ABSTRACT

A thermosetting resin is formed from cyclopentadiene and a propargyl halide The resin can be used with carbon fibers to form a carbon—carbon composite.

6 Claims, No Drawings

CYCLOPENTADIENE DERIVATIVES FOR CARBON-CARBON COMPOSITES

This is a divisional of application Ser. No. 08/835,893 filed Apr. 8, 1997, now U.S. Pat. No. 5,973,092. This application also claims benefit of Provisional U.S. application Ser. No. 60/614,927 filed Apr. 8, 1996.

BACKGROUND OF THE INVENTION

The present invention relates to carbon—carbon composites and monomers used in their formation. More particularly, the invention relates to a new family of monomers used in the formation of carbon—carbon composites.

Interest in carbon—carbon composites has grown exponentially in recent years. The combination of high specific strength retention at elevated temperatures and chemical inertness have led to their use in applications such as aircraft brakes, space vehicle heatshields and rocket nozzles.

Although the properties of carbon—carbon composites make them very useful, there are inherent problems with typical precursors such as pitch and many thermoset resins used to fabricate these composites. One of the most severe limitations of the presently used precursors is low char yields during pyrolysis. Typical thermoset precursors yield 50–65 weight percent carbon after pyrolysis. This results in the need for repeated impregnation cycles with resin to achieve a void-free sample.

Another problem with typical thermoset and pitch based carbon precursors arises from the high viscosities and intractable nature of these materials. This often results in poor wetting of the reinforcing fiber and/or the need for higher pressures and temperatures during the impregnation cycles.

Accordingly, it would be a significant advancement in the art to provide a precursor for carbon—carbon composites which had a low viscosity. It would be a further advancement in the art if such a resin had a char yield of greater than about 75%.

SUMMARY OF THE INVENTION

One aspect of the present invention comprises a new family of monomers based on alkene and alkyne derivatives of cyclopentadiene useful in the formation of carbon—carbon composites. These monomers are synthesized by reacting freshly prepared cyclopentadiene with allyl halides or propargyl halides in the presence of excess aqueous base and an appropriate phase transfer catalyst. Suitable catalysts include crown ethers, polyoxyethylene and quaternary ammonium salts. Purification of the resulting monomers involves washing with aqueous acid and base, and in some cases, extraction distillation or chromatography.

In another aspect of the present invention, the cyclopentadiene derivative resins are used as a thermoset precursor for carbon—carbon composites. Carbon fibers are coated with the resin and thermally cured. In one preferred embodiment, carbon fibers were coated with a propargylated cyclopentadiene (PCP) resin in a stainless steel mold. Pressure was applied to squeeze out excess resin and consolidate the fibers. The resin was then cured at 165° C. for 6 hours and 250° C. for 6 hours.

DETAILED DESCRIPTION OF THE PREFERRED EMBODIMENTS

The present invention is directed to a new family of thermosetting resins and their use in the formation of carbon—carbon composites. The resins comprise substituted cyclopentadiene.

In a preferred embodiment, the resins are synthesized by reacting freshly prepared cyclopentadiene with propargyl halides in the presence of excess aqueous base and an appropriate phase transfer catalyst. Suitable catalysts include crown ethers, polyoxyethylene and quaternary ammonium salts. One preferred catalyst is tetrabutylammonium bromide. Suitable propargyl halides include propargyl chloride and propargyl bromide.

These new monomers are highly reactive and oxidatively unstable. Exposure to air leads to incorporation of alcohol, acid and aldehyde or ketone functionality. Accordingly, during preparation it is important to remove and exclude air from the reaction to prevent oxidation of the resin.

In one embodiment, propargyl chloride is reacted with cyclopentadiene with an excess aqueous base to form the compounds set for in equation 1 wherein n equals 2–6.

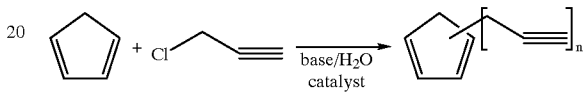

(1)

In a second embodiment propargyl bromide is reacted with cyclopentadiene in the presence of excess aqueous base and a suitable catalyst to form the reaction product set forth in Equation 1 where n=2–6.

After synthesis, the resins are extracted and purified. In a preferred embodiment, the resins are extracted with toluene and washed with dilute acid, water and brine to remove the phase transfer catalyst. Yields of resin are nearly quantitative with respect to the cyclopentadiene. The product consists of a mixture of isomers of multiply substituted cyclopentadienes with degrees of functionality ranging from 2 to 6 propargyl groups per ring.

Carbon-carbon composite formation involves simple impregnation of carbon fiber preforms or mats with the liquid resin followed by thermal cure. The thermal cure is generally carried out in the absence of air which can cause side reactions such as the incorporation of alcohol, acid and aldehyde or ketone functionality. The composites are cured at temperatures up to about 350° C.

In one preferred embodiment, the thermal cure is performed at 165° C. for 6 hours and 250° C. for 6 hours. The cure times and temperatures can be adjusted as necessary depending upon the size of the samples and their intended use.

In another preferred embodiment, initiators or catalysts can be used in the curing process including free radical initiators, cationic initiators and metal salts capable of catalyzing polyadditon and methathesis reactions. Such compounds are known to those skilled in the art.

Once cured, the composite products are thermally and oxidatively stable to high temperatures; e.g., heating to 1000° C. in the absence of air causes less than 25% weight loss for these composites. This is extremely low in comparison to other resins currently used for carbon—carbon composite formation.

The advantages of the monomers of the present invention are their low viscosity for ease if impregnation and handling, their facile cure through uncatalyzed thermal reaction or initiated/catalyzed reactions to give highly condensed carbon networks, and extremely good thermal and oxidative stability of cured materials.

The composites of the present invention have many applications including thermally conductive brake linings for automotive and aircraft brakes, high thermal stability engine parts (piston and cylinder walls) and aerospace components in both structural and non-structural applications.

EXAMPLE 1

Dicyclopentadiene was cracked thermally at 175° C. to obtain cyclopentadiene. This cyclopentadiene was then mixed neat with a concentrated NaOH solution in the presence of tetrabutylammonium bromide phase transfer catalyst. Propargyl bromide was added to the reaction dropwise with rapid stirring and cooling as needed. Air was removed and excluded from the reaction vessel in order to prevent oxidation of the resin.

After essentially all of the cyclopentadiene was reacted the product was extracted with toluene and washed with dilute acid, water and brine to remove the phase transfer catalyst. The product consisted of a mixture of isomers of multiply substituted cyclopentadienes with degrees of functionality ranging from 2 to 6 propargyl groups per ring.

A sample of this PCP resin cured at 250° C. was pyrolized at 1000° C. The resin maintained approximately 75% of the its initial weight.

EXAMPLE 2

A carbon—carbon composite was fabricated using the resin from Example 1. AS-4 unsized carbon fibers manufactured by Hercules Inc. were cut to length and placed unidirectionally in a stainless steel mold. These fibers were then coated with the PCP resin of Example 1. The process was repeated until a part of appropriate thickness was formed within the mold. A stainless steel plug was then placed over the sample and mechanical pressure was applied to squeeze out excess resin and consolidate the fibers.

The sample was then cured at 165° C. for 6 hours and 250° C. for 6 hours. The resulting composite was 70±3 volume percent carbon fiber. The cured resin had a glass like appearance. During acoustic testing, the composite had a metallic ring, characteristic of a void-free sample.

FTIR was used to characterize the thermal cure of the PCP resin. The peak at 3290 $cm^{-1}$ representative of the C—H stretch of the propargyl group, and the peak at 2120 $cm^{-1}$ representative of the triple bond stretching of the propargyl functionality, were completely gone in the cured sample indicating complete reaction of the functional groups. The appearance of a broad peak in the 3400–3500 $cm^{-1}$ region as well as the 1700–1600 $cm^{-1}$ region (OH and carbonyl groups) suggest that oxidative cross-linking may have been responsible for a significant amount of the cure reaction.

As can be seen from the foregoing, the present invention provides a novel thermoset resin which can be used in carbon—carbon composites. The composites exhibit good consolidation, matrix-fiber adhesion and mechanical properties.

While the invention has been described with respect to the presently preferred embodiments, it will be appreciated by those skilled in the art that changes and modifications can be made without departing from the spirit or scope of the invention. Accordingly, the scope of the invention is defined by the appended claims rather than by the foregoing description and all changes or modifications which come within the meaning and range of the claims are to be embraced within their scope.

We claim:

1. A carbon—carbon composite comprising carbon fibers and a cured alkyne derivative of cyclopentadiene, said cured alkyne derivative having a char yield at 1,000° C. of about 75%.

2. A carbon—carbon composite as defined in claim 1 wherein the cyclopentadiene derivative comprises the reaction product of cyclopentadiene with a propargyl halide.

3. A carbon—carbon composite as defined in claim 2 wherein the propargyl halide comprises propargyl bromide.

4. A carbon—carbon composite as defined in claim 2 wherein the propargyl halide comprises propargyl chloride.

5. A carbon—carbon composite as defined in claim 2 wherein the cyclopentadiene derivative is thermally cured.

6. A carbon—carbon composite comprising carbon fibers and a cured alkene derivative of cyclopentadiene, said cured alkene derivative having a char yield at 1,000° C. of about 75%.

* * * * *